United States Patent [19]

Kuhl

[11] Patent Number: 5,407,295
[45] Date of Patent: Apr. 18, 1995

[54] SHAFT-HUB LINKAGE

[76] Inventor: Hans Kuhl, Kornbergweg 12, D-7310 Plochingen, Germany

[21] Appl. No.: 952,898

[22] PCT Filed: Mar. 20, 1992

[86] PCT No.: PCT/EP92/00623

§ 371 Date: Jan. 14, 1993

§ 102(e) Date: Jan. 14, 1993

[87] PCT Pub. No.: WO92/16763

PCT Pub. Date: Oct. 1, 1992

[30] Foreign Application Priority Data

Mar. 22, 1991 [DE] Germany ............... 41 09 530.8

[51] Int. Cl.6 ............................................. F16B 2/18
[52] U.S. Cl. ...................................... 403/350; 403/343; 403/352; 403/367
[58] Field of Search ............... 403/350, 352, 351, 367, 403/383, 409.1, 343, 342, 348, DIG. 8

[56] References Cited

U.S. PATENT DOCUMENTS

| | | | |
|---|---|---|---|
| 611,556 | 9/1898 | Blanton, Jr. | 403/352 |
| 2,234,486 | 3/1941 | Craig | 403/350 X |
| 2,284,847 | 6/1942 | Raymond | 403/350 |
| 2,322,420 | 6/1943 | Craig | 403/350 |
| 2,479,698 | 8/1949 | Paquin | 403/350 X |
| 2,584,740 | 2/1952 | Reynolds . | |
| 3,572,779 | 3/1971 | Dawson | 403/285 X |
| 3,920,342 | 11/1975 | Warda | 403/352 |
| 4,632,596 | 12/1986 | Boehne | 403/280 X |

FOREIGN PATENT DOCUMENTS

| | | | |
|---|---|---|---|
| 652004 | 3/1929 | France . | |
| 95101 | 4/1897 | Germany . | |
| 2354902 | 5/1975 | Germany . | |
| 3900797 | 5/1988 | Germany . | |
| 558868 | 1/1944 | United Kingdom | 403/350 |
| 2022214 | 12/1979 | United Kingdom . | |

Primary Examiner—Randolph A. Reese
Assistant Examiner—Harry C. Kim
Attorney, Agent, or Firm—Eckert Seamans Cherin & Mellott

[57] ABSTRACT

The present invention relates to a shaft-hub linkage which has a plurality of wedge-shaped projections on the peripheral surface of the shaft and a corresponding number of wedge-shaped recesses on the inner peripheral surface of the hub.

10 Claims, 7 Drawing Sheets

SHAFT-HUB LINKAGE

The present invention relates to a shaft-hub linkage which has a plurality of wedge-shaped projections on the peripheral surface of the shaft and a corresponding number of wedge-shaped recesses on the inner peripheral surface of the hub.

This invention is not restricted to rotary shaft-hub linkages, it also concerns fixed linkages between stationary members such as tubes and pins. In so far the term shaft is also understood to mean a pin or spigot or journal, and the term hub also includes a tube or pipe according to the present invention.

A known shaft-hub linkage of this kind (DE 95 101) has a plurality of wedge-shaped or key surfaces ascending in the peripheral direction of the shaft and cooperating with corresponding wedge-shaped surfaces provided in hubs. The plurality of wedge-shaped surfaces serves for achieving simple variation of the angular position of the eccentrics, lifting devices and similar supporting hubs on the shaft. The wedge-shaped surfaces follow eccentric circles or involutes towards the axis of the shaft. Thus, only line contact can be obtained which results in an extremely high surface pressure and limited torque transmittability or transferability. The gradient or ascent or taper of about 1:20 following from the dimensions indicated in this publication causes a certain jamming of the hub on the shaft, which suffices to prevent jumping of the hubs when lifts move beyond their support. However, it does not form a durable linkage between hub and shaft, which serves for transmitting almost equal torques in both directions of rotation.

Therefore, it was the object of this invention to further develop a shaft-hub linkage of the above-mentioned type in such a way that the support of the wedge-shaped surfaces is distributed over the entire surfaces thereof to achieve the highest possible transmittable torques and that a high degree of interlock is achieved in both directions of rotation to bring about the transmittability or transferability of at least almost equally high torques.

This problem is solved according to aspects of the invention as follows. Owing to mutual relative motion of the members shaft and hub provided with the wedge-shaped or key surfaces, particularly owing to the twisting and in special embodiments of the invention also to the displacement towards the shaft axis, shaft and hub are initially centered with respect to each other when the entire surfaces of opposite wedge-shaped surfaces get into contact, and interlocking frictional engagement occurs between the wedge-shaped surfaces and thus between shaft and hub when the movement is continued. The relative motion stops at the latest when the induced torque is no longer sufficient to overcome the frictional engagement and thus positive engagement is reached. The frictional engagement permits the shaft-hub linkage according to the invention to receive, in addition to torques, considerable axial forces in the direction of the shaft axis.

The logarithmic spiral is the even curve having equal gradient over the entire course thereof. In the present case, this results in the fact that, with mutual relative motion of thus designed wedge-shaped surfaces provided on a shaft and a hub about a joint axis, all points of the wedge-shaped surfaces start touching and supporting one another at the same time. The logarithmic spiral is the mathematically exact form of this curve. However, in practice the aspired result is also achieved by means of curves approximated more or less to the logarithmic spiral, since minor deviations from the perfect course are compensated by the elastic and/or plastic deformability of the material used for the wedge-shaped surfaces. Thus, arcs of a circle having radii, centers and central angles can be found which only lead to imperceptible deviations from the perfect case when wedge-shaped surfaces are designed in accordance therewith. Therefore, only a circular spline profile is usually mentioned below for the purpose of simplification.

The amount of interlocking of a key connection does not only depend on the gradient of the keys or wedges but also on the properties of the key or wedge material, particularly their elastic/plastic behavior and the surface quality of the keys, i.e. their roughness, for example. According to the invention the gradient of the key surfaces is chosen in consideration of the properties of these materials in such a way that a high degree of interlocking is achieved, so that its moment of release is almost as high as the moment by which it has been brought about.

It has turned out that a gradient of 1:50 and less interlocks cooperating wedge-shaped surfaces to such a high degree that almost equally high torques can be transmitted in both directions of rotation, so that the shaft-hub linkage is virtually independent of the direction of rotation. Gradients of less than 1:200, however, result in interlocking that can hardly be released again and may also imply the danger of "slippage" depending on the properties of the materials.

The base of the keys where they taper off from the highest point to the lowest point of the adjacent key is of no importance for the function of the invention. It may be within a radius of the shaft and hub, respectively, and have edges. From a manufacturing point of view, however, it is advantageous to use an S-shaped transition which can be produced in a simpler fashion when the circular spline profile is manufactured by means of milling as well as extrusion.

The amount of relative motion between shaft and hub serving for effecting the linkage is chosen on the basis of the materials used, the dimensions and the desired power transmission and is preferably 5° to 25° in the case of the rotary motion. This angle of twist only commences when opposite wedge-type surfaces abut against each other, i.e. when a clearance optionally present between shaft and hub has been consumed by an initial relative motion to be left out of consideration as regards its amount.

Owing to the relative motion between shaft and hub the wedge-shaped surfaces of shaft and hub are not only pressed against each other but the material of shaft and hub is also displaced in the region of the wedge-shaped surfaces. It depends on the degree of hardness of the material chosen for shaft and hub whether the material is displaced only in the hub or only in the shaft or in both. It is preferred to use work-hardening materials for shaft and hub. Structural steels of high strength and alloyed heat-treatable steels show marked work hardening within the plastic range. In contrast thereto, structural steels of low strength and some unalloyed heat-treatable steels show perfect plastic behavior, which is of advantage in the proposed shaft-hub linkage only under certain circumstances due to the great surface pressure and gap pressure, respectively, between shaft and hub. The work-hardening properties of said materials ensure very great pressure between shaft and hub and thus a correspondingly high transmittable torque. Depending on the demands made on the shaft-and-hub linkage, it may be advantageous to use materials having an elastic/perfectly plastic stress-strain behavior.

Equal gradient of cooperating wedge-shaped surfaces serves for achieving that all areas of the wedge-shaped surfaces have equal surface pressure and thus an altogether maximum bearing capacity is obtained without exceeding a maximum surface pressure in those areas where wedge-shaped surface pairs occur. In those cases in which differing surface pressures are desired for certain reasons, this can be achieved by correspondingly different gradients of cooperating wedge-shaped surfaces or by a wedge-shaped surface gradient increasing or decreasing in the peripheral direction.

However, the proposed shaft-hub linkage cannot only transmit torques but also considerable axial forces due to the resulting frictional and positive engagements. This is the case especially when the wedge-shaped surfaces are inclined towards the axis of shaft and hub, i.e. are conical. This offers the possibility of achieving interlocking not only by twisting shaft and hub relative to each other but also by the axial displacement of the two members relative to each other. For example, the shaft can narrow towards the end disposed in the hub to receive great shearing forces e.g. for accommodating rotary tools or thicken to receive great tensile forces e.g. for boring tools. With a correspondingly close fit joining of shaft and hub is only possible by means of heat in the latter case. Here, especially high, transmittable tensile forces result.

A single-start or multi-start helical arrangement of the wedge-shaped surfaces also offers the possibility of achieving interlocking of the shaft-hub linkage by mutual axial displacement of shaft and hub and also offers the advantage that interlocking even increases when torsional strain and shearing stress/tensile load of the shaft-hub linkage are superimposed.

The object on which the invention is based can already be met by two wedge-shaped surfaces on shaft and hub each. However, an arrangement of three or more wedge-shaped surfaces offers the advantage that shaft and hub are accurately centered relative to each other by means of the wedge-shaped surfaces. Three wedge-shaped surfaces each are especially advantageous, since they result in optimum centering and permit gentle gradients with large key or wedge heights excluding slippage.

The several wedge-shaped surfaces may have equal length in the peripheral direction, i.e. extend over equal central angles and be distributed uniformly, i.e. at equal mutual distance, around the periphery of shaft and hub. However, another arrangement is also advantageous in some cases. An asymmetric design or arrangement of the wedge-shaped surfaces may serve for engaging shaft and hub in a key-like manner only in a special angular position.

When shaft and/or hub consists of a material, e.g. plastics, having properties by which necessary parameters such as e.g. surface pressure cannot be achieved, the wedge-shaped surfaces can be developed in packings or collars which can be mounted on the shaft and inserted in the hub, respectively. Even if the wedge-shaped surfaces wear due to frequent loosening of the shaft-hub linkage, this solution of using exchangeable packings or collars is advantageous.

In order to increase and/or ensure interlocking, at least one of the wedge-shaped or key surfaces can be provided, with a microserration known per se so as to obtain an even greater frictional engagement in a selectable preferred direction by means of a fish-scale effect.

Owing to the high gap pressure existing between the wedge-shaped surfaces entering into operative connection, shaft and hub are joined by cold welding, so that, in addition to positive and frictional engagements, integral engagement can also be achieved by the shaft-hub linkage according to the invention. This is of advantage when the shaft-hub linkage shall not be loosened again. This joining by cold welding can optionally be facilitated and accelerated by a special treatment of the wedge-shaped surfaces such as polishing.

Loosening of the shaft-hub linkage can also be prevented by filling the gap forming between the rear sides of the wedge-shaped surfaces when the wedge-shaped surfaces are moved for the purpose of connection. This serves for achieving that shaft and hub cannot be moved in the reverse direction again, so that the interlocking cannot be loosened. Here, positive engagement results in the direction of reverse movement which, in principle, is somewhat less favorable as regards the transmittable torque. Plastic material which is almost incompressible is especially suitable for the filling.

The gradient of the wedge-shaped surfaces and the distance between the wedge-shaped surfaces in shaft and hub are usually chosen such that the intended transmittable torque of the shaft-hub linkage is obtained before the wedge-shaped surfaces can slip one below the other e.g. due to the displacement of material, the linkage of shaft and hub thus failing to take effect. However, in some cases it is advantageous to develop the arrangement in such a way that as a torque securement the shaft-hub linkage can slip through when a certain torque has been exceeded. The shaft-hub linkage according to the invention then contains kind of a protection from destruction resulting from overload. In this connection, it is also possible to trigger the safety shut-down of the shaft-hub linkage drive.

The wedge-shaped surfaces can be produced by removing material e.g. by milling, planing or the like or be extruded in an especially inexpensive manner.

The wedge-shaped surfaces need not occupy the entire periphery of the shaft. In some cases, it is permissible or even desired to provide distances between the wedge-shaped surfaces, in the regions of which the shaft may be cylindrical.

Due to its special design the shaft-hub linkage according to the invention is at least a hybrid between frictional engagement and positive engagement. The positive engagement results from the development of the wedge-shaped surfaces and the fact that the relative displacement between shaft and hub reaches a degree which does no longer permit any further relative displacement owing to the surface pressure achieved. Before this point has been reached there is already frictional engagement permitting to transmit a torque also in the opposite direction of rotation, which enhances when said positive engagement has been attained to such a degree that it corresponds or almost corresponds to the torque to be transmitted by positive engagement.

As compared to the other known kinds of such linkages such as integral ones—e.g. weld joints or solder joints—it has the advantage of simpler assembly and easy releasability. As compared to frictionally engaged shaft-hub linkages—such as devices serving for exerting an external pressure on a linkage—it has the advantage of increased transmittable torque, simpler design and thus cheaper production as well as reduced space requirement and weight. For example, a conical device of said type has a cross-section, length and weight frequently excluding its use. The requirements made on the dimensional accuracy (tolerances) thereof are comparatively low. In those cases in which comparative connections call for tolerances within the $\mu$ range, it makes do with values within the 1/10 mm range.

A special advantage of the proposed shaft-hub linkage consists in that depending on load and design a production with very great clearance, i.e. wide gap between the wedge-shaped surfaces, is possible and thus the assembly is facilitated considerably.

A suitable measure of facilitating the joining of the shaft-hub linkage according to the invention, particularly in the case of very gentle gradients, consists in allowing the gradient of the wedge-shaped surfaces to increase in the direction of joining. For example, the gradient at the shaft end may be 1:200 and—based on the same base circle—may gradually increase to 1:100 towards the other end of the wedge-shaped surfaces. At the end of the shaft this leads to a greater clearance between the wedge-shaped surfaces in shaft and hub, which facilitates the joining.

On the other hand, the greater the clearance or gap between opposite wedge-shaped surfaces, the greater the amount of relative motion which is required for overcoming this clearance and lost as an effective surface for the frictional or positive engagement. If it is important to keep this loss minor because the surface pressure acting upon the remaining wedge-shaped surfaces would otherwise become too great, the clearance should be as close as possible and particularly approach zero. Furthermore, it is even possible to create a negative clearance between the wedge-shaped surfaces before the shaft and hub are joined, i.e. to make the diameter of the hub bore smaller than the corresponding diameter of the shaft. Combining of shaft and hub is then only possible when shaft and hub are joined thermally, i.e. when the hub is heated so as to at least compensate the negative clearance. In this case, the shaft-hub linkage according to the invention shows another advantage: If during thermal joining the hub exceeds a limiting temperature that depends on the material, a marked decrease of the yield point will have to be expected, which markedly reduces the transmittability of conventional shaft-hub linkages. In contrast thereto, reduction of the yield point is not necessarily disadvantageous for the present shaft-hub linkage. In the latter case, the workhardening deformation rather occurs all the earlier when corresponding structural steels having high strength and alloyed heat-treatable steels, respectively, are used.

The fatigue stress concentration factors of the shaft-hub linkage according to the invention can also be kept very low with respect to bending and torsion, since there is room for a geometrically optimized interpretation of the transitions of the wedge-shaped surfaces due to the rotary relative motion of shaft to hub.

The figures of the drawing illustrate the principle of the invention and some advantageous embodiments by way of diagram. In this connection, the keys or wedges are shown with strongly exaggerated gradient and the wedge-shaped surfaces are outlined as base circles for the purpose of simplification.

FIGS. 10 to 12 show sectional views of a device for fixing the shaft-hub linkage according to the invention.

Figure 1:
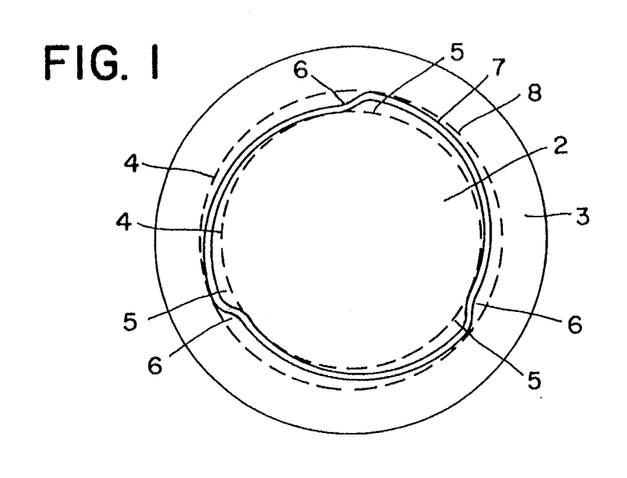
FIG. 1 shows the front view of a shaft/hub pair in the joining position.
Figure 2:
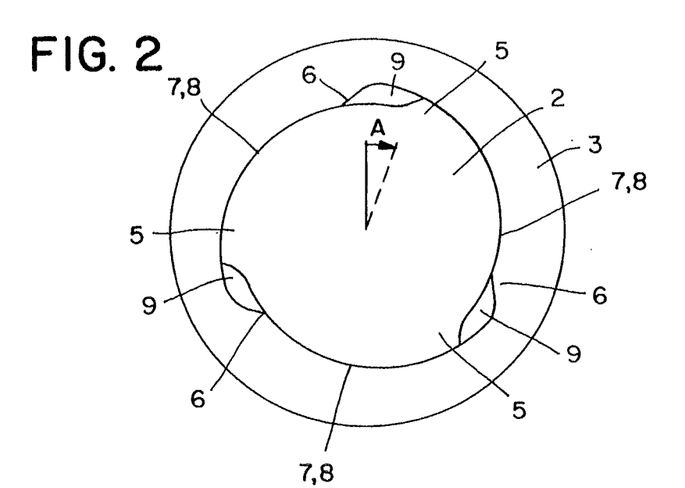
FIG. 2 shows it in the linkage position.

According to FIGS. 1 and 2 the shaft-hub linkage connects a shaft 2 with a hub 3. The hub 3 may be a wheel, a cam, another shaft, etc.,—examples of such shafts and hubs are described below. At least in an area in which shaft 2 and hub 3 are telescoped and which extends in the direction of the shaft axis over a length corresponding approximately to the diameter of the shaft, shaft 2 and hub 3 are not circular in cross-section but have in each case three equal, projecting keys or wedges 5 and 6, respectively, over a base circle 4 and 4', respectively. The keys or wedges 5 and 6 ascend with gentle gradient and taper off steeply from their highest point to the lowest point of the adjacent wedge. In the perfect case, their ascending wedge-shaped surfaces 7, 8 follow the course of a logarithmic curve, in other words their gradient is equal and constant in all points along the course thereof. The distance between the wedge-shaped surfaces 7 of shaft 2 and the wedge-shaped surfaces 8 of hub 3 is minor, in any case it is considerably less than the difference between the distance of the highest point of a wedge-shaped surface 7 of the shaft 2 and the distance of the highest point of a wedge-shaped surface 8 of the hub from the longitudinal axis of shaft 2. As a result, shaft and hub can be easily telescoped.

In order to be able to firmly connect shaft 2 and hub 3 together, the two members are twisted relative to each other, i.e. shaft 2 is turned clockwise in the direction of arrow A or hub 3 is turned counterclockwise or both are turned in the respective direction of rotation. As a result, the distance between the wedge-shaped surfaces 7 of shaft 2 and the wedge-shaped surfaces 8 of hub 3 is reduced until all wedge-shaped surfaces abut in pairs. In this position the centration of hub 3 with respect to shaft 2 is achieved. The angle of rotation depends on the clearance between the two members.

Owing to the special feature represented by the uniform gradient of a logarithmic spiral, the wedge-shaped surfaces 7 and 8 contact immediately over their entire surfaces. Upon further rotation frictional engagement and a rapidly increasing, throughout equally high surface pressure occur between the wedge-shaped surfaces. The rotary motion is continued until either the intended moment to be transmitted or the angular position provided between shaft 2 and hub 3 has been attained. By correspondingly selecting the gradient of the wedge-shaped surfaces, the properties of the material of the wedge-shaped surfaces, the dimensional ratios, etc., the angle which this frictionally engaged rotary motion covers is chosen such that it is about 5° to 25°. The end position reached is shown in FIG. 2. Owing to the relative motion of wedges 5 and 6 the descending sides thereof have moved away from each other and formed a clearance 9.

Figure 3:
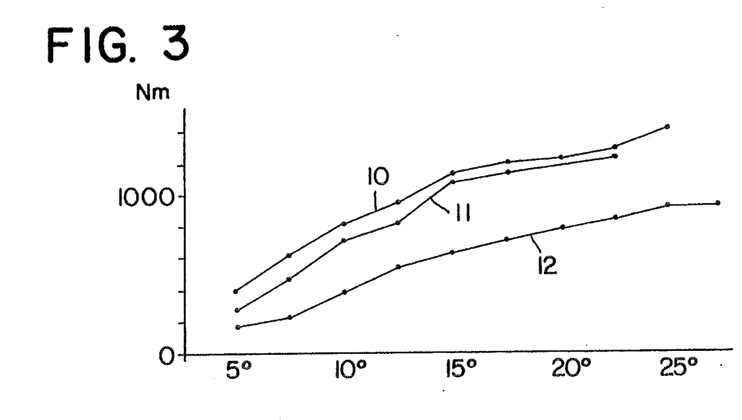
FIGS. 3 and 4 how diagrams illustrating transmittable moments on the basis of the angle of twist.
Figure 4:
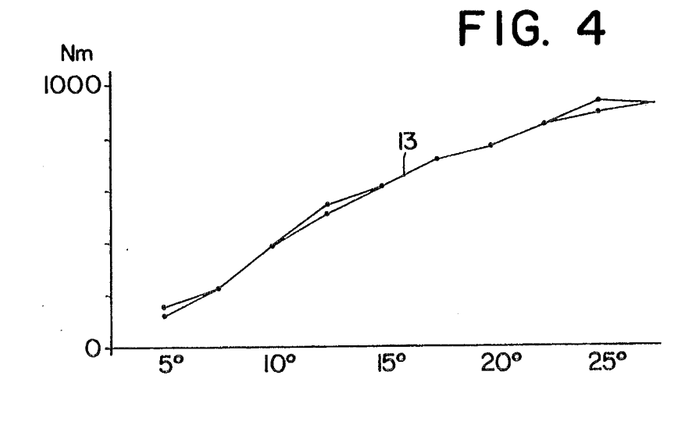

The diagrams of FIGS. 3 and 4 show the transmittable torque in the ordinate above the angle of twist in the abscissa for some shaft/hub pairs. The material of shaft and hub is always St50, shaft diameter and hub length are 30 mm each. Line 10 in FIG. 3 shows the moments of a shaft-hub linkage, each having three wedge-shaped surfaces having a gradient of 1:50, line 12 has a gradient of 1:100. Line 11 shows the moments occurring when six wedge-shaped surfaces each and a gradient of 1:50 are employed.

FIG. 4 depicts the moments during twisting and loosening of a shaft/hub pair, each having three wedge-shaped surfaces with a gradient of 1:100 and, as for the rest, the above-mentioned parameters. It turns out that the moment of release is virtually the same as that occurring when the shaft-hub linkage is being joined. The lines of moment coincide in line 13. Correspondingly, the shaft-hub linkage according to the invention is a firm connection in both directions of rotation, i.e. it is independent of the direction of rotation.

Figure 5:
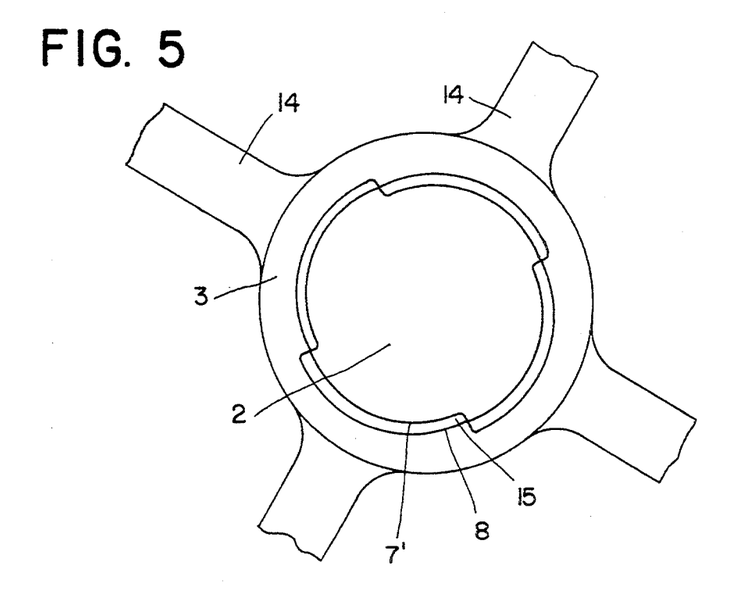
FIGS. 5 and 6 show joining and linkage positions respectively, of another embodiment of the invention.
Figure 6:
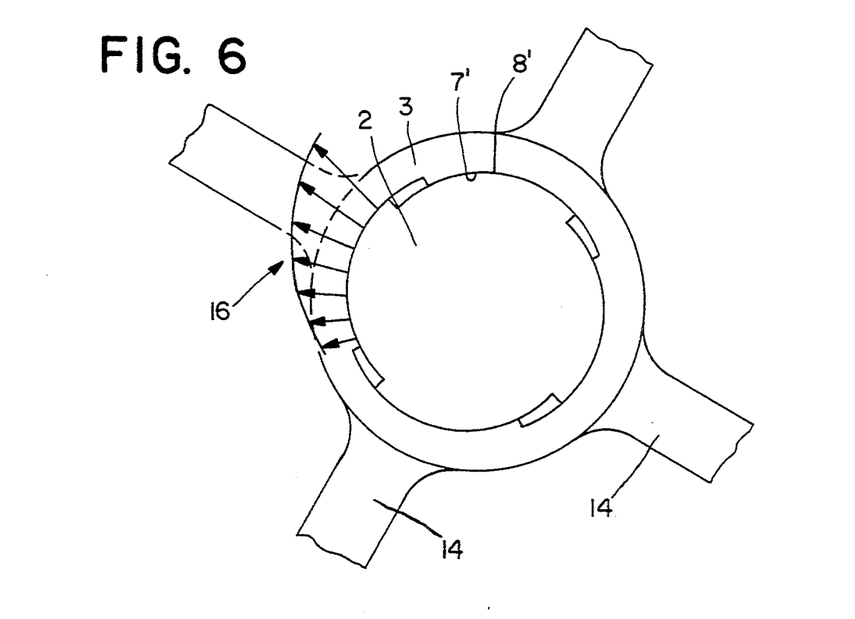

FIGS. 5 and 6 show an embodiment of a shaft-hub linkage according to the invention, each having four wedge-shaped surfaces 7' and 8', respectively, with differing gradients and a hub 3 having four spokes 14. The differing gradients of the wedge-shaped surfaces 7' in shaft 2 and the wedge-shaped surfaces 8' in hub 3 result in a wedge-shaped gap 15 located between opposite wedge-shaped surfaces. When shaft 2 and hub 3 are turned relative to each other, first the less distant areas of the wedge-shaped surfaces abut and start building up a surface pressure. Due to the displacement of material in the already abutting areas of the wedge-shaped surfaces 7', 8', the other areas can also abut when the turning motion is continued. As a result of the wedge-like gap 15 and the delayed abutment of certain areas, respectively, differing surface pressure builds up in the wedge-shaped surfaces, which is indicated by the differing length of arrows 16 representing amount and direction of the surface pressure. The position of wedge-shaped surfaces 7' and 8' and spokes 14 relative to one another is chosen such that the greater surface pressures are found in the regions of the spokes where they can be received by the reinforcing effect of the spokes.

Figure 7:
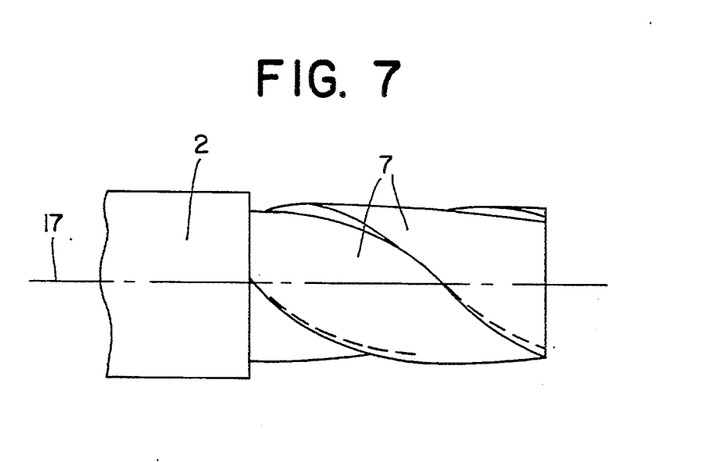
FIGS. 7 and 8 show the views of two shaft ends having inclined and helically extending wedge-shaped surfaces.
Figure 8:
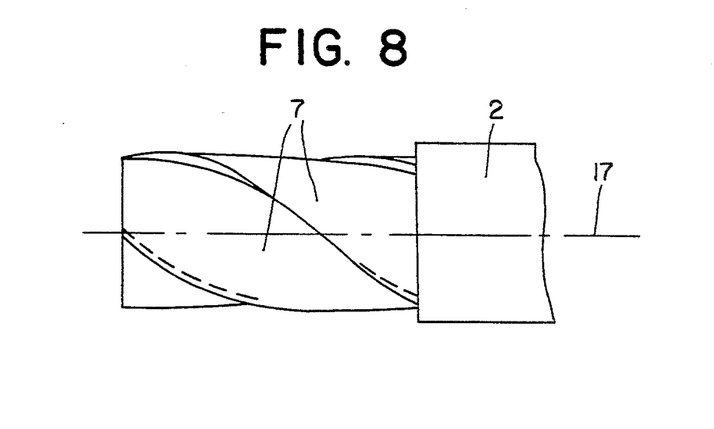

FIGS. 7 and 8 show embodiments having wedge-shaped surfaces 7 inclined towards the longitudinal axis 17 of shaft 2 and extending additionally in the form of a screw, i.e. in FIG. 7 in such a way that the shaft narrows towards its end. This shaft 2 can be inserted in the corresponding hub (not shown) by a helical motion. The firm connection between shaft and hub can be effected herein by mutual twisting as well as by pushing shaft and hub together. This embodiment appears to be advantageous for receiving rotary tools by machine tools such as drills, milling cutters and the like. However, according to FIG. 8 the inclination of the wedge-shaped surfaces 7 can also be such that the shaft 2 thickens towards its end. In this embodiment the frictional engagement is even increased when the shaft-hub linkage is tensile-loaded. This is of advantage for certain applications of the invention.

It is understood that the inclination and the turn of the wedge-shaped surfaces in shaft and hub can also be employed per se in each case depending on the demands made on the application.

Figure 9:
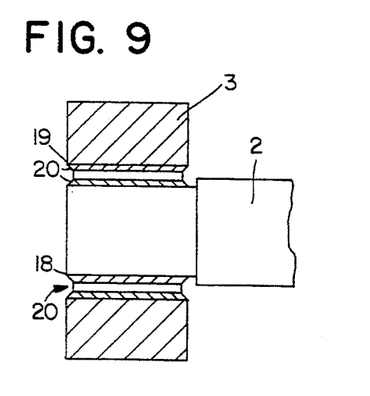
FIG. 9 shows the longitudinal section through a shaft-hub linkage having a spline profile on packings.

FIG. 9 depicts the arrangement of the circular spline profile on packings or collars 18 and 19. A packing 18 is firmly connected to, e.g. adhered to, welded to or shrunk on, shaft 2. This firm connection is outlined by weld seam fillets 20. Correspondingly, hub 3 is firmly connected to a packing 19. The packing 18 of shaft 2 has the circular spline profile on its outer side. The packing 19 of hub 3 has it on its inner side. As described above, shaft 2 and hub 3 can be connected firmly but detachably by means of twisting via the packings 18 and 19.

Packings 18 and 19 may consist of the same material as or one differing from shaft 2 and hub 3, respectively. In those cases in which shaft and hub are made of less resistant material such as plastics or light metal, the packings are advantageously made of steel, for example. If the shaft-hub linkage has to be attached and loosened frequently and thus is subject to great wear, the packings may be made of the same material as shaft and hub but be mounted thereon in an easily exchangeable manner. Even if shaft and hub consist of hardly processable material, this packing solution will offer itself.

Figure 10:
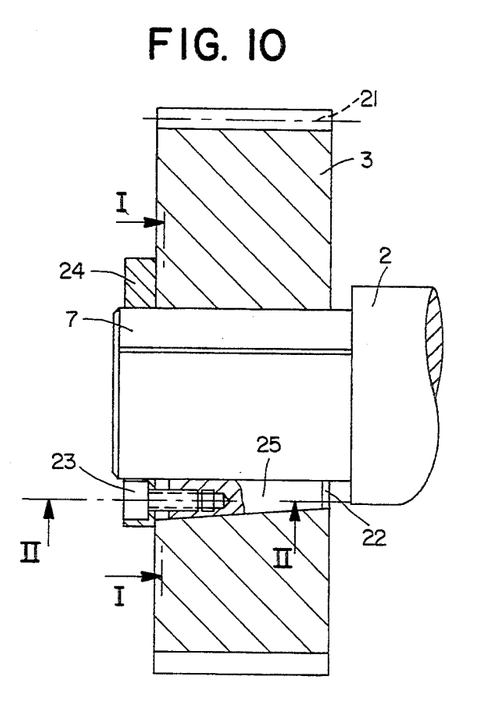
Figure 11:
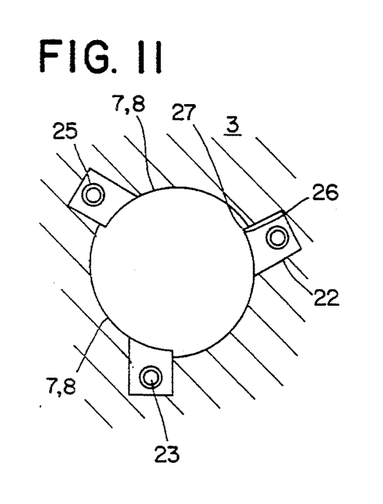
FIG. 11 shows it in plane I-I and FIG. 12 in plane II-II of FIG. 10.
Figure 12:
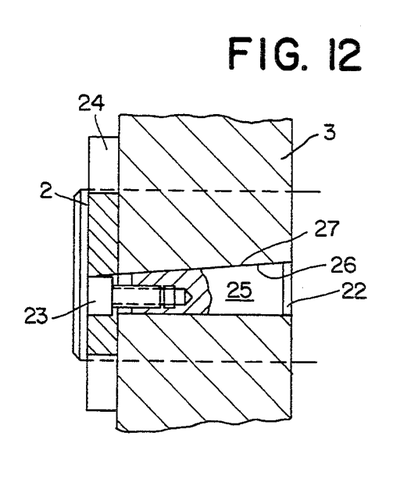

FIGS. 10 to 12 show tightening elements for twisting the shaft-hub linkage so as to establish the frictional engagement. For this purpose, axis-parallel grooves 22, the number of which equals the wedge-shaped surfaces 7, 8 of the shaft-hub linkage, are arranged in hub 3 of a toothed wheel 21, for example. Keys or wedges 25 which as follows from FIG. 12 narrow towards the end of shaft 2 are slidable in the grooves by means of screws 23 supported by a ring 24 abutting against the toothed wheel 21. As follows from FIG. 10, the depth of the grooves 22 increases towards the end of shaft 2 to avoid jamming of the keys when they are moved. One of the side faces 26 of the keys 25 also abuts against the head 27 of the wedge-shaped surfaces 7 of shaft 2 or against the side faces of grooves provided in shaft 2 (not shown).

For fixing the shaft-hub linkage the keys 25 are moved towards the end of shaft 2 by turning screws 23 thereby twisting the hub 3 relative to shaft 2 due to their wedge shape and their guidance in grooves 22 and the abutment of their side faces 26 against the head 27 of the wedge-shaped surfaces 7, respectively, such that the frictional engagement is established between the wedge-shaped surfaces 7 and 8 in shaft 2 and 3, respectively. The fixed keys between shaft 2 and hub 3 also safely prevent turning back and thus loosening of the frictional engagement. This embodiment combines the effect of the described filling of the clearance 9 of FIG. 2 and the advantage that, if necessary, it is possible to eliminate the blocking of the reverse motion again.

Figure 13:
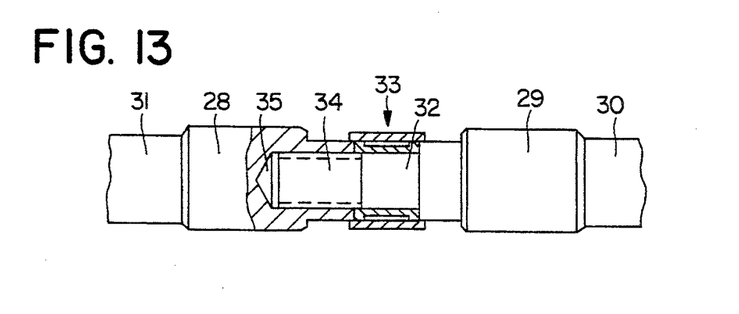
FIG. 13 shows a longitudinal section through the end sections of two drawing roller sections of spinning machines.

An advantageous application of the invention is represented by the connection of drafting roller sections. The distorting rollers, partially having a length of over 30 m, of spinning machines such as ring spinners or flyers consist of short sections having a length of about 600 mm, which have to be connected in torsion-resistant manner but detachably with each other at their joints which are simultaneously the bearing points thereof. FIG. 13 shows the last or first fluted field 28, 29 of two adjacent roller sections 30, 31. Roller section 30 has a cylindrical pin 32 onto which the inner raceway of an antifriction bearing 33 supporting the roller is pushed. Towards its end the pin 32 has the (outer) spline profile according to the invention with e.g. three wedge-shaped surfaces in region 34. The (hub) bore 35 of roller section 31 is provided with the corresponding (inner) spline profile.

For the assembly of the entire drawing roller strand the pins 32, representing shafts, of the roller sections such as 30 are inserted in the bores 35 of the roller sections, e.g. 31, representing hubs and firmly connected to each other by means of twisting effected by drafting nippers, for example. Due to its frictional engagement, this linkage can also receive the retaining moments frequently required at the inlet roller as experience shows, without the linkage loosening. If required, the linkage can also be loosened again, so that e.g. damaged roller sections can be exchanged.

Up to now it has been common to connect the roller sections by means of threads. The circular spline profiles according to the invention weaken the roller sections markedly less and thus reduce the torsion of the rollers resulting from the torque load in the operating condition, which is disadvantageous for spinning. Since the threads have to be tapped into each other until the end faces of the roller sections abut, the roller sections must have very close longitudinal tolerances. When the circular spline profiles according to the invention are used, this is not necessary. In this case, the roller sections can be connected in the required longitudinal position. Since the shaft-hub linkage according to the invention does not depend on the direction of rotation, it is not necessary to produce differing parts for the two machine sides of a spinning machines as has to be done when threads are used.

Figure 14:
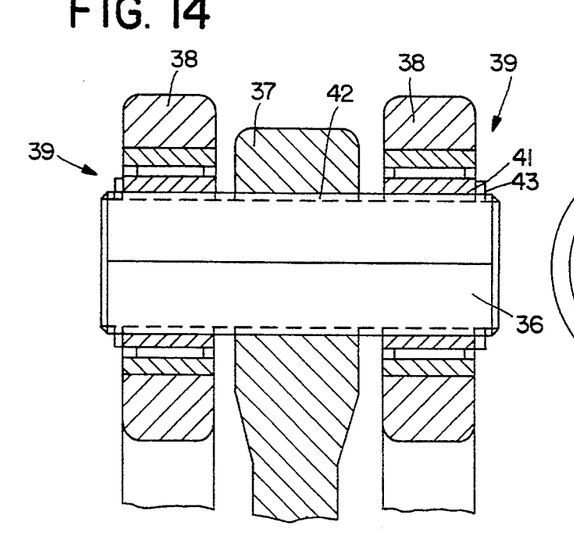
FIG. 14 shows in part a longitudinal section through a joint of a knitting machine.

In connection with a crankdrive mechanism of a knitting machine according to FIG. 14 the object was to hold in a rotation-and displacement-resistant manner a stud 36 having a length of about 100 mm and consisting of solid material or thick-wall tube having a diameter of about 25 mm in a connecting rod 37 and to support on both sides articulated arms 38 on clearance-free antifriction bearings 39. For this purpose, the stud 36 was provided externally with the three-spline profile 42 according to the invention, and the inner side of the connecting rod 37 and the inner raceways 41 of the antifriction bearings 39 were provided on the interior therewith. The gradient of the three-spline profile 42 was chosen to be 1:100 or 1:200.

Figure 15:
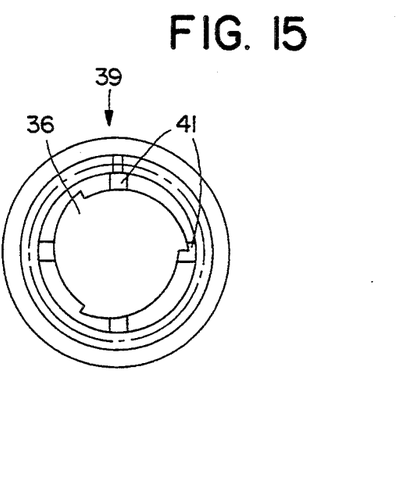
FIG. 15 shows the view of a detail of the joint of FIG. 14.

For the assembly of the crankdrive mechanism, the stud 36 is initially inserted in the eye of the connecting rod 37 and anchored in the connecting rod by the cooperating three-spline profiles 42 by turning it in the eye of the connecting rod. Then, the antifriction bearings 39 and the articulated arms 38 are slipped onto the stud 36 on both sides of the connecting rod 37 and the antifriction bearings are made clearance-free by controlled twisting of their inner raceways 41 at key surfaces 43 and by widening them effected thereby using the three-spline profile 42 as well as anchored on the stud 36 by frictional engagement. Owing to the feature according to the invention, i.e. the gradient of the wedge-shaped surfaces is constant, the inner raceways of the antifriction bearings are widened absolutely uniformly over the entire periphery without jamming being possible in individual regions but with the centration being maintained. Widening may take place sensitively within the μ range by the selected, very gentle gradient of 1:100 or even less.

This design is considerably simpler and cheaper than the formerly used embodiment, in which the connecting rod bearing is slotted and joined by screws and the stud is also slotted at the ends and had to be provided with taper bores within which tapers had to be fixed by means of screws.

Figure 16:
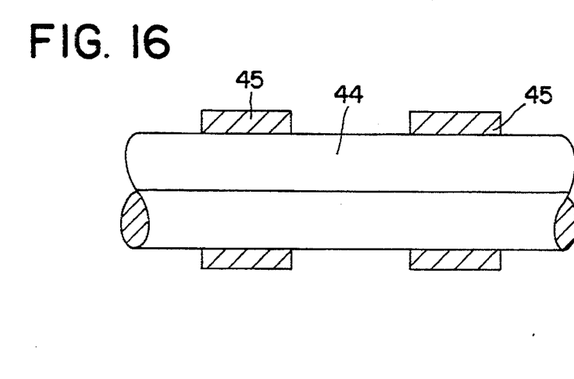
FIGS. 16 and 17 show a longitudinal section and end view, respectively, of a camshaft.
Figure 17:
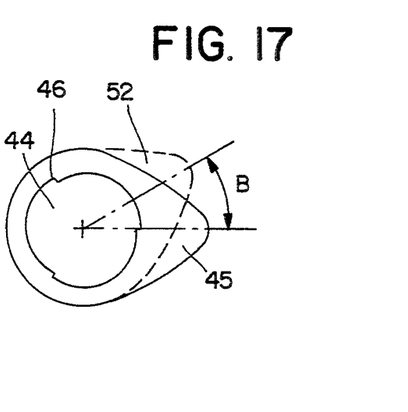

FIGS. 16 and 17 show the use of the invention for a camshaft having the features of the invention. The camshaft 44, only a section of which is shown herein, consists of a preferably hollow shaft having an outer three-spline profile. Cams 45 having an inner three-spline profile 46 and corresponding to the hubs 3 of the claims are pushed onto this shaft and turned in the proper position along shaft 44 by means of a turning device from the initial position shown in dashed lines in FIG. 17 by angle B into the proper angular position relative to the camshaft. The inner three-spline profile of the various cams 45 is inserted in each case in an angular position that guarantees achievement of the proper cam angle of between about 5° and 20° by the torsion angle of the spline serration.

The turning means advantageously has a torque measuring device which serves for examining whether an intended torque is achieved and thus the cam fits sufficiently firmly when each cam is turned into its cam angle. If this is not the case, a defect of fabrication is given and the camshaft can be disposed as being defective. In this way, 100% quality control is ensured. The turning means can be driven by a sensitive stepping motor by which the intended angular position can be attained with a high degree of accuracy. The torque measuring device can be designed as a load cell between the stepping motor and its mounting. It appears to be particularly advantageous to measure the current drawn by the stepping motor and being almost proportional to the moment exerted.

Figure 18:
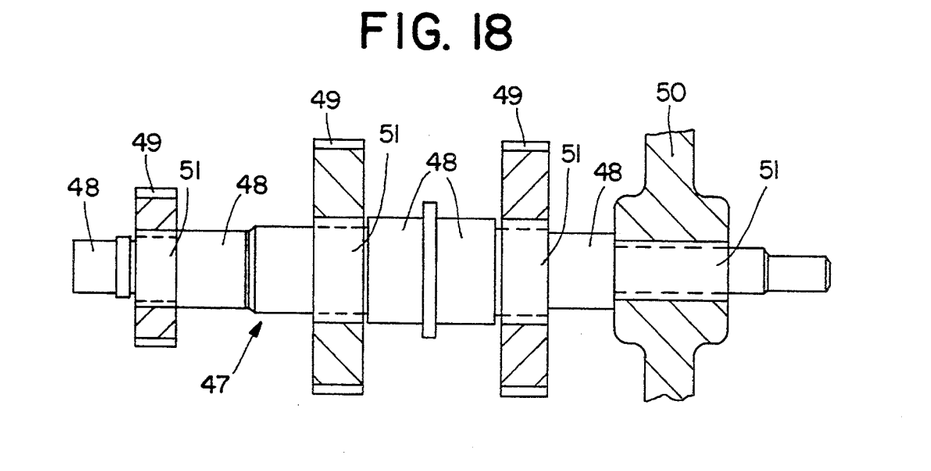
FIG. 18 shows the longitudinal section through a gear shaft.

The invention also permits a very advantageous embodiment of a gear shaft e.g. for a vehicle gear box as shown in FIG. 18. Up to now the toothed wheels of such gear shafts have to be heated and pressed on by means of 15-ton presses. The gear shaft 47 according to the invention has cylindrical regions 48 where it can be supported and whose end faces form axial abutments for the toothed wheels 49 and a clutch body 50. The toothed wheels 49 and clutch body 50 represent the hubs herein. In those regions in which the toothed wheels 49 and the clutch bodies 50 are disposed, the gear shaft 47 has the spline profile 51 according to the invention, to which spline profiles in the bores of the toothed wheels and the clutch body correspond. Due to the minor height of the spline profile, the gear shaft according to the invention may have a reduced diameter and thus be developed more simply than formerly possible.

For the assembly of the toothed wheels 49 and the clutch body 50 on the crankshaft 47, these members are pushed onto the gear shaft and attached by twisting as described above already several times. In this case, the spline profile of one of the toothed wheels 49 can be oriented oppositely to the spline profiles of the other toothed wheels 49, so that this toothed wheel may serve for supporting the gear shaft when mounting it and another toothed wheel. Here, too, it is possible to measure the moment employed for the attachment and check when the desired moment has been reached, so as to obtain a 100% control of all mounted toothed wheels and thus of all finished gear shafts as to firm fit at the same time as the attachment.

Figure 19:
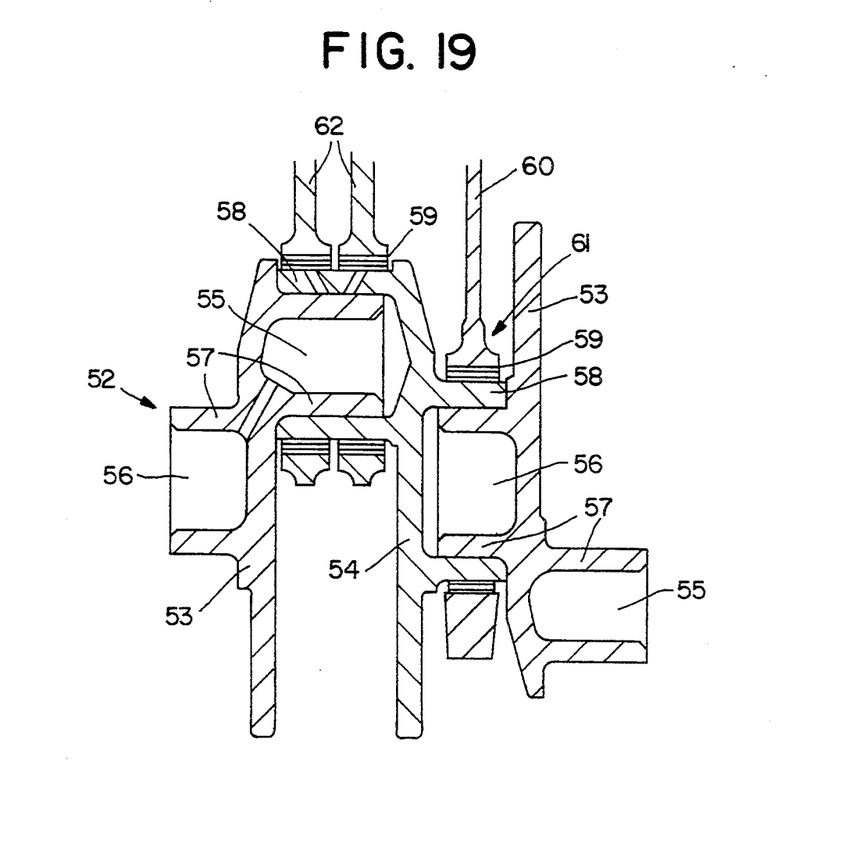
FIG. 19 shows the longitudinal section through a crankshaft of an internal combustion engine.

The embodiment according to FIG. 19 shows a crankshaft design of an internal combustion engine comprising the features of the invention. The crankshaft 52, only a section of which is shown herein, consists of a plurality of cheeks 53 of a first kind and of cheeks 54 of a second kind. Each of the cheeks 53 and 54 has a connecting rod journal 55 and a main bearing journal 56. These journals are provided as interior (hollow) "shafts" 57 having an outer three-spline profile at cheeks 53 of one kind. In the drawing, the spline profiles are outlined by a dashed line. The journals at the cheeks 54 of the other kind are developed as outer "hubs" 58 having an inner three-spline profile and are provided with bearing surfaces for the inner raceways of the antifriction bearings 59 on their outer sides, on which the crankshaft 52 is supported in the main bearing 61 connected with the crankshaft housing via a land 60 and the two connecting rods 62 of an engine having a V-shaped cylinder arrangement, respectively. The cheeks 53 and 54 may advantageously be finely forged in forging dies and the wedge-shaped surfaces as well as the bearing surfaces are processed accurately in accordance therewith.

In the design of crankshaft 52 closed sliding or antifriction bearings 59 as well as closed connecting rods 62 are pushed e.g. onto the (hub) connecting rod journal 55 of a cheek 54 without being joined by screws. Thereafter, the (shaft) connecting rod journal 55 of a cheek 53 is inserted in the connecting rod journal 55 of cheek 53 and turned into the angular position by applying a corresponding torque, in which position the main bearing journals 56 of both cheeks are in alignment with each other, in other words form the crankshaft axis. The angular position of the spline profiles is chosen such that the required transmittable moment of the linkage is attained when adjacent cheeks have the proper angular position relative to one another.

Then, the antifriction bearing 59 of a main bearing 61 is pushed onto the (hub) main bearing journal 56 of cheek 54, the (shaft) main bearing journal 56 of a cheek 53 is inserted in the main bearing journal 55 of cheek 53 and, by applying a corresponding torque, turned into the angular position in which the connecting bearing journals 55 of these two cheeks have the desired angle relative to each other.

This process is alternately repeated using cheeks of both kinds (the outer cheeks shown are equal) and optionally using flywheel, steering wheel and dynamo drive wheel until the crankshaft is complete. This design reduces the weight of the crankshaft due to the cavities provided in the shafts and enables easy exchange of worn-out bearings. It permits the design of crankshafts having any number of connecting rod throws consisting of two types of cheek.

Figure 20:
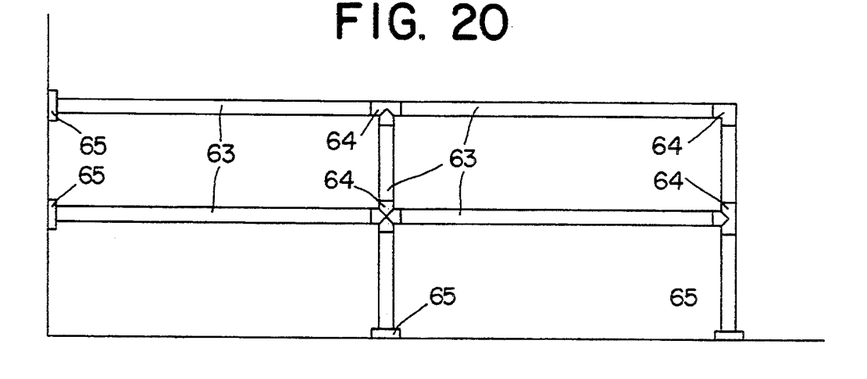
FIG. 20 shows the view of a railing.
Figure 21:
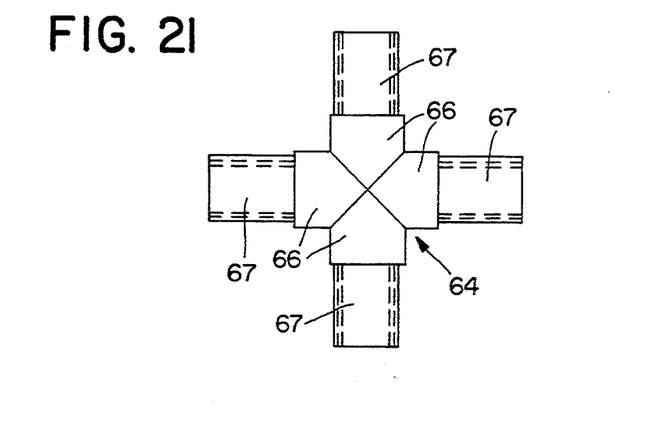
FIGS. 21 and 22 show a detail of the subject matter of FIG. 19 from two different directions, the shaft-hub linkage according to the invention being used in each case.
Figure 22:
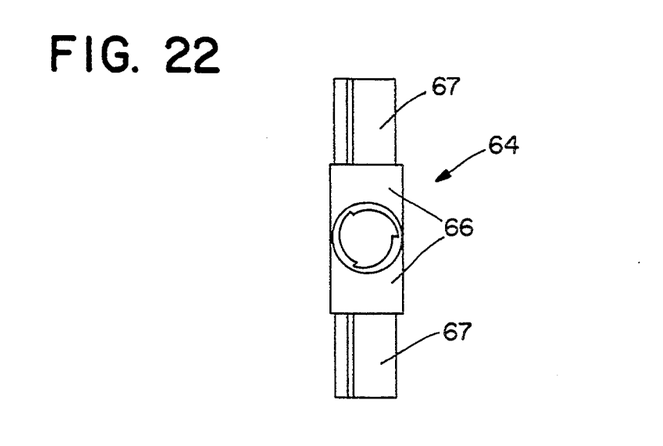

For tubular designs such as railings of staircases or machines, warp creels for textile machines, ladders and the like, tubes 63 e.g. of a railing according to FIG. 20 may be provided as extruded profiles with the inner circular spline profile according to the invention and the pertinent joint parts 64 ( ⌐ -, ⊤ -, + -and other parts) and bases 65 may be provided with the corresponding profile on the outside. This is shown by a -profile in FIGS. 21 and 22. The middle four-ray area consists of cylindrical pins 66 adjacent to which pins 67 having the spline profile according to the invention are attached. The length of these pins 67 is 1 ... 2 times the diameter of tube 63 depending on the load. The gradient of the circular spline profile is matched with the properties of the material, e.g. light metal, and is 1:50, for example. The joint parts 64 and the bases 65 may advantageously be made of steel as a forging having calibrated circular spline profile or by means of die casting and plastic injection molding.

By cutting tubular pieces 63 into fitting lengths, inserting the corresponding joint parts 64 and bases 65, respectively, and twisting the tubes and parts relative to one another, it is possible to produce tubular designs of any kind such as shown e.g. in FIG. 20 in a rapid and simple manner. Further mounting members are not required. As shown in the drawing, the tube is discontinued at the joints when a spline profile is provided in the interior of the tubes 63. When the profile is attached in another embodiment (not shown) on the tube exterior, one tube can pass beyond a joint position.

I claim:

1. A shaft-hub linkage comprising:
   a shaft defining a longitudinal axis and a peripheral surface, and being formed with a plurality of wedge-shaped projections on the peripheral surface of the shaft;
   a hub defining an inner surface in which the shaft is telescoped and securely interlocked, and being formed with as many wedge-shaped recesses in the inner surface, as there are said wedge-shaped projections on the shaft;
   the wedge-shaped projections defining one set of wedge-shaped surfaces and the wedge-shaped recesses defining another set of wedge-shaped surfaces;
   each of the wedge-shaped surfaces of both said sets defines, in a plane extending generally perpendicular to the longitudinal axis, a segment of a logarithmic spiral, wherein secure interlocking between the hub and shaft is achieved by such relative displacement between the hub and shaft that causes the wedge-shaped projections and the wedge-shaped recesses to abut in pairs.

2. The shaft-hub linkage according to claim 1, characterized in that said each of the wedge-shaped surfaces of both said sets defines a gradient ranging from about 1/50 to 1/200.

3. The shaft-hub linkage according to claim 2, characterized in that the gradient of said each of the wedge-shaped surfaces increases in a peripheral direction.

4. The shaft-hub linkage according to claim 1, characterized in that abutting pairs of the recesses and projections define cooperating wedge-shaped surfaces that have an equal gradient.

5. The shaft-hub linkage according to claim 1, characterized in that abutting pairs of the recesses and projections define cooperating wedge-shaped surfaces with differing gradients.

6. The shaft-hub linkage according to claim 1, characterized in that the shaft is formed with at least three wedge-shaped projections.

7. The shaft-hub linkage according to claim 1, wherein the set of wedged-shaped surfaces of the shaft or the hub is formed by a packing.

8. The shaft-hub linkage according to claim 1, characterized in that at least one of the wedge-shaped surfaces of both said sets is provided with a microserration.

9. The shaft-hub linkage according to claim 1, characterized in that the wedge-shaped surfaces are prepared and treated such that cold welding results between the shaft and the hub after the projections and recesses have been abutted in pairs.

10. The shaft-hub linkage according to claim 1, further comprising a filling placed in a clearance defined between the shaft and the hub after the projections and recesses have been abutted in pairs.

* * * * *